US010120446B2

(12) United States Patent
Pance et al.

(10) Patent No.: US 10,120,446 B2
(45) Date of Patent: Nov. 6, 2018

(54) HAPTIC INPUT DEVICE

(75) Inventors: Aleksandar Pance, Saratoga, CA (US);
Omar Sze Leung, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/950,940

(22) Filed: Nov. 19, 2010

(65) Prior Publication Data

US 2012/0127088 A1   May 24, 2012

(51) Int. Cl.
| G06F 3/01 | (2006.01) |
| G06F 3/0354 | (2013.01) |
| G06F 3/041 | (2006.01) |
| G06F 3/0481 | (2013.01) |
| G06F 3/0488 | (2013.01) |

(52) U.S. Cl.
CPC .......... G06F 3/016 (2013.01); G06F 3/03545 (2013.01); G06F 3/041 (2013.01); G06F 3/0488 (2013.01); G06F 3/04812 (2013.01); G06F 2203/04105 (2013.01)

(58) Field of Classification Search
CPC . G06F 3/016; G06F 3/01; G06F 3/017; G06F 3/04812; G06F 3/03545; G06F 3/0416; G06F 3/0488; G06F 3/042; G06F 3/0317; G06F 2203/04104; G06F 2203/04106; G06F 3/03454; A63F 13/06
USPC ..... 345/173, 156, 163–167, 179; 340/407.2; 178/19.01–19.05; 382/106–107, 181, 382/317, 187–189, 312–314; 702/92–95; 235/472.01–472.03
See application file for complete search history.

(56) References Cited

U.S. PATENT DOCUMENTS

| 3,001,049 A | 9/1961 | Didier |
| 3,390,287 A | 6/1968 | Sonderegger |
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |

(Continued)

FOREIGN PATENT DOCUMENTS

| AU | 2015100710 | 7/2015 |
| AU | 2016100399 | 5/2016 |

(Continued)

OTHER PUBLICATIONS

International Search Report and Written Opinion, PCT/US2011/060463, 20 pages, dated Mar. 8, 2012.

(Continued)

*Primary Examiner* — Kumar Patel
*Assistant Examiner* — Amen Bogale
(74) *Attorney, Agent, or Firm* — Brownstein Hyatt Farber Schreck, LLP

(57) ABSTRACT

One embodiment of a haptic input device may include a receiver configured to receive a signal from a touch-based user interface device. The signal may include a control signal or a look-up value. The haptic input device may also include a decoder coupled to the receiver and configured to decode the signal from the touch-based user interface device, at least one sensor configured to determine at least one characteristic of the haptic input device, a controller coupled to the one or more sensors and configured to transmit a control signal, a haptic actuator coupled to the controller, and a transmitter coupled to the at least one sensor.

16 Claims, 9 Drawing Sheets

(56) References Cited

U.S. PATENT DOCUMENTS

| | | |
|---|---|---|
| 4,695,813 A | 9/1987 | Nobutoki et al. |
| 4,975,616 A | 12/1990 | Park |
| 5,010,772 A | 4/1991 | Bourland |
| 5,245,734 A | 9/1993 | Issartel |
| 5,283,408 A | 2/1994 | Chen |
| 5,293,161 A | 3/1994 | MacDonald et al. |
| 5,317,221 A | 5/1994 | Kubo et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A | 10/1999 | Lo et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,069,433 A | 5/2000 | Lazarus et al. |
| 6,078,308 A | 6/2000 | Rosenberg et al. |
| 6,127,756 A | 10/2000 | Iwaki |
| 6,135,886 A | 10/2000 | Armstrong |
| 6,218,966 B1 | 4/2001 | Goodwin |
| 6,220,550 B1 | 4/2001 | McKillip, Jr. |
| 6,222,525 B1 | 4/2001 | Armstrong |
| 6,252,336 B1 | 6/2001 | Hall |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,954,657 B2 | 10/2005 | Bork et al. |
| 6,963,762 B2 | 11/2005 | Kaaresoja et al. |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,091,948 B2 | 8/2006 | Chang et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,161,580 B2 | 1/2007 | Bailey et al. |
| 7,162,928 B2 | 1/2007 | Shank et al. |
| 7,170,498 B2 | 1/2007 | Huang |
| 7,180,500 B2 | 2/2007 | Marvit et al. |
| 7,182,691 B1 | 2/2007 | Schena |
| 7,194,645 B2 | 3/2007 | Bieswanger et al. |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,269,484 B2 | 9/2007 | Hein |
| 7,333,604 B2 | 2/2008 | Zernovizky et al. |
| 7,334,350 B2 | 2/2008 | Ellis |
| 7,348,968 B2 * | 3/2008 | Dawson ........................ 345/179 |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,595 B2 | 12/2008 | Kessler et al. |
| 7,495,358 B2 | 2/2009 | Kobayashi et al. |
| 7,561,142 B2 | 7/2009 | Shahoian et al. |
| 7,562,468 B2 | 7/2009 | Ellis |
| 7,569,086 B2 | 8/2009 | Kikuchi et al. |
| 7,575,368 B2 | 8/2009 | Guillaume |
| 7,586,220 B2 | 9/2009 | Roberts |
| 7,619,498 B2 | 11/2009 | Miura |
| 7,639,232 B2 | 12/2009 | Grant et al. |
| 7,641,618 B2 | 1/2010 | Node et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,737,828 B2 | 6/2010 | Yang et al. |
| 7,742,036 B2 | 6/2010 | Grant et al. |
| 7,788,032 B2 | 8/2010 | Moloney |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,886,621 B2 | 2/2011 | Smith et al. |
| 7,886,631 B2 | 2/2011 | Smith et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,031,172 B2 | 10/2011 | Kruse et al. |
| 8,069,881 B1 | 12/2011 | Cunha |
| 8,072,418 B2 | 12/2011 | Crawford et al. |
| 8,081,156 B2 | 12/2011 | Ruettiger |
| 8,082,640 B2 | 12/2011 | Takeda |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,169,401 B2 | 5/2012 | Hardwick |
| 8,179,202 B2 | 5/2012 | Cruz-Hernandez et al. |
| 8,188,623 B2 | 5/2012 | Park et al. |
| 8,205,356 B2 | 6/2012 | Ellis |
| 8,210,942 B2 | 7/2012 | Shimabukuro et al. |
| 8,232,494 B2 | 7/2012 | Purcocks |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,288,899 B2 | 10/2012 | Park et al. |

(56) References Cited

U.S. PATENT DOCUMENTS

| | | | |
|---|---|---|---|
| 8,291,614 B2 | 10/2012 | Ellis | |
| 8,294,600 B2 | 10/2012 | Peterson et al. | |
| 8,315,746 B2 | 11/2012 | Cox et al. | |
| 8,378,798 B2 | 2/2013 | Bells et al. | |
| 8,384,316 B2 | 2/2013 | Houston et al. | |
| 8,384,679 B2 | 2/2013 | Paleczny et al. | |
| 8,390,594 B2 | 3/2013 | Modarres et al. | |
| 8,395,587 B2 | 3/2013 | Cauwels et al. | |
| 8,398,570 B2 | 3/2013 | Mortimer et al. | |
| 8,411,058 B2 | 4/2013 | Wong et al. | |
| 8,446,264 B2 | 5/2013 | Tanase | |
| 8,451,255 B2 | 5/2013 | Weber et al. | |
| 8,461,951 B2 | 6/2013 | Gassmann et al. | |
| 8,466,889 B2 | 6/2013 | Tong et al. | |
| 8,471,690 B2 | 6/2013 | Hennig et al. | |
| 8,515,398 B2 | 8/2013 | Song et al. | |
| 8,542,134 B2 | 9/2013 | Peterson et al. | |
| 8,545,322 B2 | 10/2013 | George et al. | |
| 8,570,291 B2 | 10/2013 | Motomura | |
| 8,575,794 B2 | 11/2013 | Lee et al. | |
| 8,596,755 B2 | 12/2013 | Hibi | |
| 8,598,893 B2 | 12/2013 | Camus | |
| 8,599,047 B2 | 12/2013 | Schlosser et al. | |
| 8,599,152 B1 | 12/2013 | Wurtenberger et al. | |
| 8,600,354 B2 | 12/2013 | Esaki | |
| 8,621,348 B2 | 12/2013 | Ramsay et al. | |
| 8,629,843 B2 | 1/2014 | Steeves et al. | |
| 8,633,916 B2 | 1/2014 | Bernstein et al. | |
| 8,674,941 B2 | 3/2014 | Casparian et al. | |
| 8,680,723 B2 | 3/2014 | Subramanian | |
| 8,681,092 B2 | 3/2014 | Harada et al. | |
| 8,682,396 B2 | 3/2014 | Yang et al. | |
| 8,686,952 B2 | 4/2014 | Pope et al. | |
| 8,710,966 B2 | 4/2014 | Hill | |
| 8,723,813 B2 | 5/2014 | Park et al. | |
| 8,735,755 B2 | 5/2014 | Peterson et al. | |
| 8,760,273 B2 | 6/2014 | Casparian et al. | |
| 8,780,060 B2 | 7/2014 | Maschmeyer et al. | |
| 8,787,006 B2 | 7/2014 | Golko et al. | |
| 8,797,152 B2 | 8/2014 | Henderson et al. | |
| 8,798,534 B2 | 8/2014 | Rodriguez et al. | |
| 8,845,071 B2 | 9/2014 | Yamamoto et al. | |
| 8,857,248 B2 | 10/2014 | Shih et al. | |
| 8,861,776 B2 | 10/2014 | Lastrucci | |
| 8,866,600 B2 | 10/2014 | Yang et al. | |
| 8,890,668 B2 | 11/2014 | Pance et al. | |
| 8,918,215 B2 | 12/2014 | Bosscher et al. | |
| 8,928,621 B2 | 1/2015 | Ciesla et al. | |
| 8,948,821 B2 | 2/2015 | Newham et al. | |
| 8,970,534 B2 | 3/2015 | Adachi et al. | |
| 8,976,141 B2 | 3/2015 | Myers et al. | |
| 9,008,730 B2 | 4/2015 | Kim et al. | |
| 9,019,088 B2 | 4/2015 | Zawacki et al. | |
| 9,035,887 B1 | 5/2015 | Prud'Hommeaux et al. | |
| 9,072,576 B2 | 7/2015 | Nishiura | |
| 9,083,821 B2 | 7/2015 | Hughes | |
| 9,092,129 B2 | 7/2015 | Abdo et al. | |
| 9,098,991 B2 | 8/2015 | Park et al. | |
| 9,122,325 B2 | 9/2015 | Peshkin et al. | |
| 9,131,039 B2 | 9/2015 | Behles | |
| 9,134,834 B2 | 9/2015 | Reshef | |
| 9,158,379 B2 | 10/2015 | Cruz-Hernandez et al. | |
| 9,189,932 B2 | 11/2015 | Kerdemelidis et al. | |
| 9,201,458 B2 | 12/2015 | Hunt et al. | |
| 9,202,355 B2 | 12/2015 | Bernstein | |
| 9,235,267 B2 | 1/2016 | Pope et al. | |
| 9,274,601 B2 | 3/2016 | Faubert et al. | |
| 9,274,602 B2 | 3/2016 | Garg et al. | |
| 9,274,603 B2 | 3/2016 | Modarres et al. | |
| 9,275,815 B2 | 3/2016 | Hoffmann | |
| 9,300,181 B2 | 3/2016 | Maeda et al. | |
| 9,317,116 B2 | 4/2016 | Ullrich et al. | |
| 9,318,942 B2 | 4/2016 | Sugita et al. | |
| 9,325,230 B2 | 4/2016 | Yamada et al. | |
| 9,357,052 B2 | 5/2016 | Ullrich | |
| 9,360,944 B2 | 6/2016 | Pinault | |
| 9,390,599 B2 | 7/2016 | Weinberg | |
| 9,396,434 B2 | 7/2016 | Rothkopf | |
| 9,405,369 B2 | 8/2016 | Modarres et al. | |
| 9,417,695 B2 | 8/2016 | Griffin et al. | |
| 9,449,476 B2 | 9/2016 | Lynn | |
| 9,454,239 B2 | 9/2016 | Elias et al. | |
| 9,467,033 B2 | 10/2016 | Jun et al. | |
| 9,477,342 B2 | 10/2016 | Daverman et al. | |
| 9,480,947 B2 | 11/2016 | Jiang et al. | |
| 9,501,912 B1 | 11/2016 | Havskjold et al. | |
| 9,544,694 B2 | 1/2017 | Abe et al. | |
| 9,594,450 B2 | 7/2017 | Lynn et al. | |
| 9,778,743 B2 | 10/2017 | Grant et al. | |
| 9,779,592 B1 | 10/2017 | Hoen | |
| 9,823,833 B2 | 11/2017 | Grant et al. | |
| 9,934,661 B2 | 4/2018 | Hill | |
| 9,990,099 B2 | 6/2018 | Ham et al. | |
| 2001/0045941 A1* | 11/2001 | Rosenberg et al. | 345/161 |
| 2002/0163510 A1* | 11/2002 | Williams et al. | 345/179 |
| 2002/0181744 A1* | 12/2002 | Vablais et al. | 382/107 |
| 2003/0128195 A1* | 7/2003 | Banerjee et al. | 345/179 |
| 2003/0210259 A1 | 11/2003 | Liu | |
| 2004/0021663 A1 | 2/2004 | Suzuki et al. | |
| 2004/0127198 A1 | 7/2004 | Roskind et al. | |
| 2005/0057528 A1 | 3/2005 | Kleen | |
| 2005/0107129 A1 | 5/2005 | Kaewell et al. | |
| 2005/0110778 A1* | 5/2005 | Ben Ayed | 345/179 |
| 2005/0116940 A1* | 6/2005 | Dawson | G06F 3/016 345/179 |
| 2005/0118922 A1 | 6/2005 | Endo | |
| 2005/0217142 A1 | 10/2005 | Ellis | |
| 2005/0237306 A1 | 10/2005 | Klein et al. | |
| 2005/0243072 A1* | 11/2005 | Denoue | G06F 3/016 345/179 |
| 2005/0248549 A1* | 11/2005 | Dietz et al. | 345/179 |
| 2005/0258715 A1 | 11/2005 | Schlabach | |
| 2006/0007184 A1* | 1/2006 | Rosenberg | A63F 13/06 345/173 |
| 2006/0014569 A1 | 1/2006 | DelGiorno | |
| 2006/0154674 A1 | 7/2006 | Landschaft et al. | |
| 2006/0209037 A1 | 9/2006 | Wang et al. | |
| 2006/0239746 A1 | 10/2006 | Grant | |
| 2006/0252463 A1 | 11/2006 | Liao | |
| 2007/0099574 A1 | 5/2007 | Wang | |
| 2007/0152974 A1 | 7/2007 | Kim et al. | |
| 2007/0178942 A1 | 8/2007 | Sadler et al. | |
| 2007/0188450 A1* | 8/2007 | Hernandez et al. | 345/158 |
| 2008/0084384 A1 | 4/2008 | Gregorio et al. | |
| 2008/0158149 A1 | 7/2008 | Levin | |
| 2008/0165148 A1* | 7/2008 | Williamson et al. | 345/173 |
| 2008/0181501 A1* | 7/2008 | Faraboschi | G06F 3/03545 382/179 |
| 2008/0192014 A1 | 8/2008 | Kent et al. | |
| 2008/0204428 A1 | 8/2008 | Pierce et al. | |
| 2008/0252594 A1 | 10/2008 | Gregorio et al. | |
| 2008/0255794 A1 | 10/2008 | Levine | |
| 2008/0291620 A1 | 11/2008 | DiFonzo et al. | |
| 2009/0002328 A1 | 1/2009 | Ullrich et al. | |
| 2009/0096746 A1* | 4/2009 | Kruse | G06F 3/014 345/156 |
| 2009/0115734 A1 | 5/2009 | Fredriksson et al. | |
| 2009/0120105 A1 | 5/2009 | Ramsay et al. | |
| 2009/0128503 A1 | 5/2009 | Grant et al. | |
| 2009/0135142 A1 | 5/2009 | Fu et al. | |
| 2009/0135153 A1* | 5/2009 | Narusawa | G06F 1/3262 345/173 |
| 2009/0135164 A1* | 5/2009 | Kyung | G06F 3/03545 345/179 |
| 2009/0167542 A1 | 7/2009 | Culbert et al. | |
| 2009/0167702 A1* | 7/2009 | Nurmi | G06F 3/0346 345/173 |
| 2009/0167704 A1 | 7/2009 | Terlizzi et al. | |
| 2009/0225046 A1 | 9/2009 | Kim et al. | |
| 2009/0236210 A1 | 9/2009 | Clark et al. | |
| 2009/0267892 A1 | 10/2009 | Faubert | |
| 2009/0267920 A1 | 10/2009 | Faubert et al. | |
| 2009/0305744 A1 | 12/2009 | Ullrich | |

(56) References Cited

U.S. PATENT DOCUMENTS

| | | |
|---|---|---|
| 2009/0313542 A1 | 12/2009 | Cruz-Hernandez et al. |
| 2010/0020036 A1 | 1/2010 | Hui et al. |
| 2010/0048256 A1 | 2/2010 | Huppi et al. |
| 2010/0053087 A1 | 3/2010 | Dai et al. |
| 2010/0079264 A1 | 4/2010 | Hoellwarth |
| 2010/0089735 A1 | 4/2010 | Takeda et al. |
| 2010/0141408 A1 | 6/2010 | Doy et al. |
| 2010/0141606 A1 | 6/2010 | Bae et al. |
| 2010/0152620 A1 | 6/2010 | Ramsay et al. |
| 2010/0164894 A1 | 7/2010 | Kim et al. |
| 2010/0188422 A1 | 7/2010 | Shingai et al. |
| 2010/0194547 A1* | 8/2010 | Terrell .................. G06F 3/016 340/407.2 |
| 2010/0231508 A1 | 9/2010 | Cruz-Hernandez et al. |
| 2010/0265197 A1 | 10/2010 | Purdy |
| 2010/0309141 A1 | 12/2010 | Cruz-Hernandez et al. |
| 2010/0328229 A1 | 12/2010 | Weber et al. |
| 2011/0012717 A1 | 1/2011 | Pance et al. |
| 2011/0053577 A1 | 3/2011 | Lee et al. |
| 2011/0075835 A1 | 3/2011 | Hill |
| 2011/0077055 A1 | 3/2011 | Hill |
| 2011/0107958 A1 | 5/2011 | Pence et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0163985 A1 | 7/2011 | Bae et al. |
| 2011/0175692 A1 | 7/2011 | Niiyama |
| 2011/0193824 A1 | 8/2011 | Modarres et al. |
| 2011/0248948 A1 | 10/2011 | Griffin et al. |
| 2011/0260988 A1 | 10/2011 | Colgate et al. |
| 2011/0263200 A1 | 10/2011 | Thornton et al. |
| 2011/0291950 A1* | 12/2011 | Tong .............................. 345/173 |
| 2011/0304559 A1 | 12/2011 | Pasquero |
| 2012/0068957 A1 | 3/2012 | Puskarich et al. |
| 2012/0075198 A1 | 3/2012 | Sulem et al. |
| 2012/0092263 A1 | 4/2012 | Peterson et al. |
| 2012/0126959 A1 | 5/2012 | Zarrabi et al. |
| 2012/0133494 A1 | 5/2012 | Cruz-Hernandez et al. |
| 2012/0139844 A1 | 6/2012 | Ramstein et al. |
| 2012/0206248 A1 | 8/2012 | Biggs |
| 2012/0223824 A1 | 9/2012 | Rothkopf |
| 2012/0256848 A1 | 10/2012 | Madabusi Srinivasan |
| 2012/0274578 A1 | 11/2012 | Snow et al. |
| 2012/0280927 A1 | 11/2012 | Ludwig |
| 2012/0286943 A1 | 11/2012 | Rothkopf et al. |
| 2012/0319827 A1 | 12/2012 | Pance et al. |
| 2012/0319987 A1 | 12/2012 | Woo |
| 2013/0027345 A1 | 1/2013 | Binzel |
| 2013/0033967 A1 | 2/2013 | Chuang et al. |
| 2013/0063356 A1 | 3/2013 | Martisauskas |
| 2013/0106699 A1 | 5/2013 | Babatunde |
| 2013/0120290 A1 | 5/2013 | Yumiki et al. |
| 2013/0124076 A1 | 5/2013 | Bruni et al. |
| 2013/0141365 A1 | 6/2013 | Lynn et al. |
| 2013/0191741 A1 | 7/2013 | Dickinson et al. |
| 2013/0207793 A1 | 8/2013 | Weaber et al. |
| 2013/0217491 A1 | 8/2013 | Hilbert et al. |
| 2013/0222280 A1 | 8/2013 | Sheynblat et al. |
| 2013/0228023 A1 | 9/2013 | Drasnin et al. |
| 2013/0261811 A1 | 10/2013 | Yagi et al. |
| 2013/0300590 A1 | 11/2013 | Dietz et al. |
| 2014/0035397 A1 | 2/2014 | Endo et al. |
| 2014/0082490 A1 | 3/2014 | Jung et al. |
| 2014/0085065 A1 | 3/2014 | Biggs et al. |
| 2014/0091857 A1 | 4/2014 | Bernstein |
| 2014/0143785 A1 | 5/2014 | Mistry et al. |
| 2014/0197936 A1 | 7/2014 | Biggs et al. |
| 2014/0232534 A1 | 8/2014 | Birnbaum et al. |
| 2014/0267076 A1 | 9/2014 | Birnbaum et al. |
| 2014/0267952 A1 | 9/2014 | Sirois |
| 2015/0005039 A1 | 1/2015 | Liu et al. |
| 2015/0040005 A1 | 2/2015 | Faaborg |
| 2015/0090572 A1 | 4/2015 | Lee et al. |
| 2015/0098309 A1 | 4/2015 | Adams et al. |
| 2015/0109215 A1 | 4/2015 | Puskarich |
| 2015/0169059 A1 | 6/2015 | Behles et al. |
| 2015/0192414 A1 | 7/2015 | Das et al. |
| 2015/0194165 A1 | 7/2015 | Faaborg et al. |
| 2015/0220199 A1 | 8/2015 | Wang et al. |
| 2015/0227204 A1 | 8/2015 | Gipson et al. |
| 2015/0296480 A1 | 10/2015 | Kinsey et al. |
| 2015/0324049 A1 | 11/2015 | Kies et al. |
| 2015/0349619 A1 | 12/2015 | Degner et al. |
| 2016/0049265 A1 | 2/2016 | Bernstein |
| 2016/0063826 A1 | 3/2016 | Morrell et al. |
| 2016/0071384 A1 | 3/2016 | Hill |
| 2016/0162025 A1 | 6/2016 | Shah |
| 2016/0163165 A1 | 6/2016 | Morrell et al. |
| 2016/0172953 A1 | 6/2016 | Degner et al. |
| 2016/0195929 A1 | 7/2016 | Martinez et al. |
| 2016/0196935 A1 | 7/2016 | Bernstein |
| 2016/0206921 A1 | 7/2016 | Szabados et al. |
| 2016/0211736 A1 | 7/2016 | Moussette et al. |
| 2016/0216764 A1 | 7/2016 | Morrell et al. |
| 2016/0216766 A1 | 7/2016 | Puskarich |
| 2016/0231815 A1 | 8/2016 | Moussette et al. |
| 2016/0233012 A1 | 8/2016 | Lubinski et al. |
| 2016/0241119 A1 | 8/2016 | Keeler |
| 2016/0259480 A1 | 9/2016 | Augenbergs et al. |
| 2016/0306423 A1 | 10/2016 | Uttermann et al. |
| 2016/0371942 A1 | 12/2016 | Smith, IV et al. |
| 2017/0038905 A1 | 2/2017 | Bijamov et al. |
| 2017/0070131 A1 | 3/2017 | Degner et al. |
| 2017/0084138 A1 | 3/2017 | Hajati et al. |
| 2017/0085163 A1 | 3/2017 | Hajati et al. |
| 2017/0192507 A1 | 7/2017 | Lee et al. |
| 2017/0192508 A1 | 7/2017 | Lim et al. |
| 2017/0255295 A1 | 9/2017 | Tanemura et al. |
| 2017/0257844 A1 | 9/2017 | Miller et al. |
| 2017/0285747 A1 | 10/2017 | Chen |
| 2017/0311282 A1 | 10/2017 | Miller et al. |
| 2017/0357325 A1 | 12/2017 | Yang et al. |
| 2017/0364158 A1 | 12/2017 | Wen et al. |
| 2018/0052550 A1 | 2/2018 | Zhang et al. |
| 2018/0075715 A1 | 3/2018 | Morrell et al. |
| 2018/0081441 A1 | 3/2018 | Pedder et al. |
| 2018/0203513 A1 | 7/2018 | Rihn |

FOREIGN PATENT DOCUMENTS

| | | |
|---|---|---|
| CA | 2355434 | 2/2002 |
| CN | 1324030 | 11/2001 |
| CN | 1817321 | 8/2006 |
| CN | 101120290 | 2/2008 |
| CN | 101409164 | 4/2009 |
| CN | 101763192 | 6/2010 |
| CN | 101903848 | 12/2010 |
| CN | 101938207 | 1/2011 |
| CN | 102025257 | 4/2011 |
| CN | 201829004 | 5/2011 |
| CN | 102246122 | 11/2011 |
| CN | 102315747 | 1/2012 |
| CN | 102591512 | 7/2012 |
| CN | 102713805 | 10/2012 |
| CN | 102844972 | 12/2012 |
| CN | 102915111 | 2/2013 |
| CN | 103019569 | 4/2013 |
| CN | 103181090 | 6/2013 |
| CN | 103218104 | 7/2013 |
| CN | 103278173 | 9/2013 |
| CN | 103416043 | 11/2013 |
| DE | 19517630 | 11/1996 |
| DE | 10330024 | 1/2005 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2264562 A3 | 12/2010 |
| EP | 2315186 | 4/2011 |
| EP | 2374430 | 10/2011 |

(56) References Cited

FOREIGN PATENT DOCUMENTS

| | | |
|---|---|---|
| EP | 2395414 | 12/2011 |
| EP | 2461228 | 6/2012 |
| EP | 2631746 | 8/2013 |
| EP | 2434555 | 10/2013 |
| JP | H05301342 A2 | 11/1993 |
| JP | 2002199689 | 7/2002 |
| JP | 2002102799 | 9/2002 |
| JP | 200362525 | 3/2003 |
| JP | 2003527046 | 9/2003 |
| JP | 2004236202 | 8/2004 |
| JP | 2010272903 | 12/2010 |
| JP | 2014509028 | 4/2014 |
| JP | 2016095552 | 5/2016 |
| KR | 20050033909 | 4/2005 |
| KR | 1020100046602 | 5/2010 |
| KR | 1020110101516 | 9/2011 |
| KR | 20130024420 | 3/2013 |
| TW | 200518000 | 11/2007 |
| TW | 200951944 | 12/2009 |
| TW | 201145336 | 12/2011 |
| TW | 201218039 | 5/2012 |
| TW | 201425180 | 7/2014 |
| WO | WO1997/16932 | 5/1997 |
| WO | WO 00/051190 | 8/2000 |
| WO | WO 2001/059588 | 8/2001 |
| WO | WO 01/089003 | 11/2001 |
| WO | WO2002/073587 | 9/2002 |
| WO | WO 2003/038800 | 5/2003 |
| WO | WO2006/057770 | 6/2006 |
| WO | WO2007/114631 | 10/2007 |
| WO | WO2008/075082 | 6/2008 |
| WO | WO2009/038862 | 3/2009 |
| WO | WO2009/068986 | 6/2009 |
| WO | WO2009/097866 | 8/2009 |
| WO | WO2009/122331 | 10/2009 |
| WO | WO2009/150287 | 12/2009 |
| WO | WO 10/085575 | 7/2010 |
| WO | WO2010/087925 | 8/2010 |
| WO | WO 11/007263 | 1/2011 |
| WO | WO 12/052635 | 4/2012 |
| WO | WO 12/129247 | 9/2012 |
| WO | WO 13/069148 | 5/2013 |
| WO | WO 13/150667 | 10/2013 |
| WO | WO 13/169302 | 11/2013 |
| WO | WO 13/173838 | 11/2013 |
| WO | WO 13/186847 | 12/2013 |
| WO | WO 14/018086 | 1/2014 |
| WO | WO 14/098077 | 6/2014 |
| WO | WO 13/169299 | 11/2014 |
| WO | WO 15/023670 | 2/2015 |

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.
Hill et al., "Real-time Estimation of Human Impedance for Haptic Interfaces," Stanford Telerobotics Laboratory, Department of Mechanical Engineering, Standford University, 6 pages, at least as early as Sep. 30, 2009.
Lee et al, "Haptic Pen: Tactile Feedback Stylus for Touch Screens," Mitsubishi Electric Research Laboratories, http://wwwlmerl.com, 6 pages, Oct. 2004.
Kim et al., "Tactile Rendering of 3D Features on Touch Surfaces," UIST '13, Oct. 8-11, 2013, St. Andrews, United Kingdom, 8 pages.
U.S. Appl. No. 14/910,108, filed Feb. 4, 2016, Martinez et al.
U.S. Appl. No. 15/045,761, filed Feb. 17, 2016, Morrell et al.
U.S. Appl. No. 15/046,194, filed Feb. 17, 2016, Degner et al.
U.S. Appl. No. 15/047,447, filed Feb. 18, 2016, Augenbergs et al.
U.S. Appl. No. 14/841,582, filed Aug. 31, 2015, Morrell et al.
U.S. Appl. No. 14/928,465, filed Oct. 30, 2015, Bernstein.
U.S. Appl. No. 14/942,521, filed Nov. 16, 2015, Hill.
Astronomer's Toolbox, "The Electromagnetic Spectrum," http://imagine.gsfc.nasa.gov/science/toolbox/emspectrum1.html, updated Mar. 2013, 4 pages.
U.S. Appl. No. 15/102,826, filed Jun. 8, 2016, Smith et al.
U.S. Appl. No. 15/251,459, filed Aug. 30, 2016, Miller et al.
U.S. Appl. No. 15/260,047, filed Sep. 8, 2016, Degner.
U.S. Appl. No. 15/306,034, filed Oct. 21, 2016, Bijamov et al.
U.S. Appl. No. 15/364,822, filed Nov. 30, 2016, Chen.
U.S. Appl. No. 15/800,630, filed Nov. 1, 2017, Morrell et al.
U.S. Appl. No. 15/881,476, filed Jan. 26, 2018, Moussette et al.
U.S. Appl. No. 15/897,968, filed Feb. 15, 2018, Hill.
Nakamura, "A Torso Haptic Display Based on Shape Memory Alloy Actuators," Massachusetts Institute of Technology, 2003, pp. 1-123.
Actuator definition downloaded from http://www.thefreedictionary.com/actuator on May 3, 2018, 2 pages.

\* cited by examiner

HAPTIC INPUT DEVICE

BACKGROUND

I. Technical Field

Embodiments described herein relate generally to input devices, and more particularly, to an input device capable of providing haptic and visual feedback to a user.

II. Background Discussion

Existing touch-based user interface devices typically have a touch panel and a visual display component. The touch panel may include a touch sensitive surface that, in response to detecting a touch event, generates a signal that can be processed and utilized by other components of an electronic device. The touch sensitive surface may be separate from the display component, such as in the case of a trackpad, or may be integrated into or positioned in front a display screen, such as in the case of a display touch screen.

Display touch screens may show textual and/or graphical display elements representing selectable virtual buttons or icons, and the touch sensitive surface may allow a user to navigate the content displayed on the display screen. Typically, a user may move one or more objects, such as a finger, a stylus, across the touch sensitive surface in a pattern that the device translates into an input command. As an example, some electronic devices allow the user to select a virtual button by tapping a portion of the touch sensitive surface corresponding to the virtual button. Some electronic devices may even detect more than one simultaneous touch events in different locations on the touch screen.

Generally, input devices do not provide haptic feedback to a user in response to interactions with the input device. The user can typically only feel the rigid surface of the touch screen, making it difficult to find icons, hyperlinks, text boxes, or other user-selectable input elements on the display. An input device capable of generating haptic feedback may help a user navigate content displayed on the display screen, and may further serve to enhance the content of various applications by creating a more appealing and realistic user interface. "Haptic feedback" may be any tactile feedback. Examples include forces, vibrations, and/or motions that may be sensed by the user.

SUMMARY

Embodiments described herein generally relate to haptic input devices that can receive an input from a user and provide haptic feedback based on the input from the user. In some embodiments, the haptic input device may be configured to interface with a touch-based user interface device, such as a touch screen. The touch-based user interface device may further include one or more input sensors, such as force sensors or position sensors, that are configured to sense one or more characteristics of a haptic input device as it engages the touch screen. For example, the one or more characteristics may include a position of the device relative to the touch screen, a pressure being applied on the touch screen surface by the haptic input device, an angle of the input device relative to the touch screen, and the like. The touch-based user interface device may determine a haptic response based on the one or more characteristics and transmit the haptic response to the haptic input device. The haptic input device may include a haptic actuator that generates haptic feedback based on the received haptic response. The haptic response may take the form of a control signal that drives a haptic actuator or a look-up value that corresponds to a control signal stored in a look-up table. In some embodiments, the haptic input device may also include additional sensors configured to sense one or more characteristics of the haptic input device, such as the orientation of the haptic input device, the acceleration of the device relative to the touch screen surface, and so on.

One embodiment may take the form of a haptic input device that includes: a receiver configured to receive a first signal from a touch-based user interface device; a decoder coupled to the receiver and configured to extract an input signal from the first signal; a controller coupled to the decoder and configured to receive the input signal from the decoder, further configured to generate a control signal based on the input signal; a haptic actuator coupled to the controller and configured to actuate in response to the input signal; at least one sensor configured to determine at least one characteristic of the haptic input device; a transmitter coupled to the at least one sensor.

Another embodiment may take the form of a touch-based user interface device. The touch-based user interface device may include: at least one transmitter configured to transmit at least one first signal to a haptic input device; at least one receiver configured to receive at least one second signal from the haptic input device; at least one input sensor configured to sense an input resulting from an object engaging a touch screen surface; at least one storage device storing one or more executable instructions; and at least one processor coupled to the at least one receiver, the at least one transmitter, the at least one input sensor, and the at least one storage device. The at least one processor may be configured to access the at least one storage device in order to execute the one or more executable instructions.

Another embodiment may take the form of a method for providing haptic feedback. The method may include receiving an input gesture from one or more input sensors, deriving a characteristic of an object engaging a touch screen surface, determining a haptic response based on the characteristic of the object engaging the touch screen, and transmitting a signal to a haptic input device. The signal may comprise a control signal or a look-up value.

DETAILED DESCRIPTION

Embodiments described herein generally relate to haptic input devices that can receive an input from a user and provide haptic feedback based on the input from the user. In some embodiments, the haptic input device may be configured to interface with a touch-based user interface device, such as a touch screen. The touch-based user interface device may further include one or more input sensors, such as force sensors or position sensors, that are configured to sense one or more characteristics of a haptic input device as it engages the touch screen. For example, the one or more characteristics may include a position of the device relative to the touch screen, a pressure being applied on the touch screen surface by the haptic input device, an angle of the input device relative to the touch screen, and the like. The touch-based user interface device may determine a haptic response based on the one or more characteristics and transmit the haptic response to the haptic input device. The haptic input device may include a haptic actuator that generates haptic feedback based on the received haptic response. The haptic response may take the form of a control signal that drives a haptic actuator or a look-up value that corresponds to a control signal stored in a look-up table. In some embodiments, the haptic input device may also include additional sensors configured to sense one or more characteristics of the haptic input device, such as the orientation of the haptic input device, the acceleration of the device relative to the touch screen surface, and so on.

Figure 1:
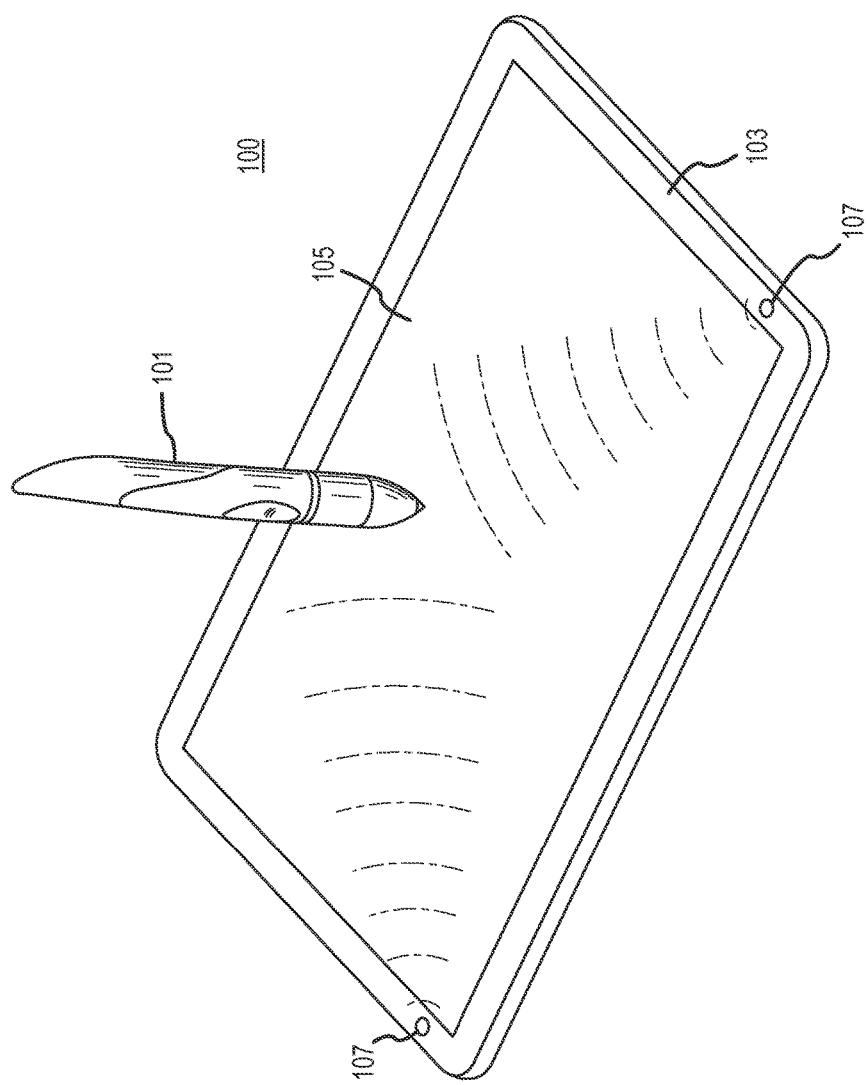
FIG. 1 illustrates one embodiment of a system incorporating a haptic input device.

FIG. 1 illustrates one embodiment of a system 100 incorporating a haptic input device 101. As shown in FIG. 1, the system 100 may include the haptic input device 101 and a touch-based user interface device 103 that serves as a user input output (I/O) device. The touch-based user interface device 103 may include a touch screen surface 105 and one or more transmitters 107 configured to transmit signals to a receiver of the haptic input device 101. The transmitters 107 may be wired or wireless transmitters, or a combination of both wired and wireless transmitters.

In one embodiment, the haptic input device 101 may be a stylus that is configured to resemble a writing utensil. For example, the stylus may include a tapered or pointed tip that is configured to contact the touch screen surface 105. In some embodiments, the tip may be capacitive in order to permit registration of the contact on the touch screen surface 105. In other embodiments, the haptic input device 101 may have other configurations. For example, the haptic input device 101 may have a blunt, as opposed to a pointed, tip, or may take the form of a ball.

The haptic input device 101 may be configured to provide haptic feedback to a user. This haptic feedback may be any type of tactile feedback that takes advantage of a user's sense of touch and/or sight, for example, by creating forces, vibrations, and/or motions that may be perceived by the user. As alluded to above, the haptic input device 101 may be configured to provide haptic feedback based on input gestures from the user. Haptic feedback may be used to enhance the user's interaction with the touch-based user interface device 103 by providing mechanical stimulation to the user when the user is engaging the device 103. For example, haptic feedback may confirm the user's selection of a particular item, such as a virtual icon or a button, or may be provided when the user's input device is positioned over a selectable item. The haptic input device 101 may also provide a haptic output when the device is over, near or passes the boundary of a window or application shown on a display, or when the device is over, near or passes a graphic item having a particular texture. It should be appreciated that haptic feedback may be provided when a cursor controlled by the haptic input device meets these or other conditions set forth in this document. Indeed, certain embodiments may employ a haptic input device to move a cursor on a display that is not touch-sensitive. Accordingly, the description, functionality and operations set forth herein generally apply to a haptic input device operating a cursor on a display screen lacking capacitive, pressure-sensing or other touch-sensing capabilities, as well.

The touch-based user interface device 103 can function as, for example, a media device, a communications device, a digital camera, a video camera, a storage device, or any other electronic device. Some examples of touch-based user interface devices 103 incorporating touch screen surfaces 105 include Apple Inc.'s iPhone.TM., iPod Nano.TM., iPod Touch.TM., and iPad.TM. devices. Other examples may include tablet personal computers, laptops, and so on. The touch screen surface 105 may include one or more input sensors that allow a user to interact with the touch-based user interface device 103 by sensing various touch-based input gestures, such as swiping, tapping, scrolling, and so on, applied across the touch screen surface 105. The input sensors may include one or more capacitive sensors, optical sensors, acoustic sensors, force sensors, and so on.

In some embodiments, the touch-based input gestures may be applied through moving an object other than a finger, such as the input device 101, or moving multiple objects simultaneously (e.g., multi-touch inputs). As will be described further below, the input sensors may obtain information regarding the sensed gestures. The input sensors may detect changes in pressure and/or capacitance from an object impacting the touch screen; such changes may be the basis for interpreting gestural input. The touch-based user interface 103 may further include one or more transmitters 107 configured to transmit the information regarding the sensed gestures to a processing device provided in the touch-based user interface device 103, which may translate the received information into a particular input command. As an example, the input sensors may derive position information, such as distance traveled and/or direction of motion, regarding a sensed gesture, and the processing device may execute certain functionality based on the received distance and/or direction information. For example, the device may interpret sensed motion as a request to move a cursor on the screen. As another example, the input sensors may be configured to sense a particular gesture or pattern of gestures and, in response, execute a particular command. For example, a tap or an application of pressure onto the touch screen surface 105 may be associated with a selection, while sliding the object along the touch screen surface 105 in a particular manner may be associated with scrolling, enlarging, shrinking, and so on. In some embodiments, a combination of gestures by a finger or other object and the haptic input device may be interpreted together to provide a particular haptic feedback to a user through the haptic input device. The processing device may be any known processing device, including, but not limited to, a central processing unit (CPU), a microprocessor, a digital signal processor (DSP), a microcontroller, a graphics processing unit (GPU), and so on.

In some embodiments, the haptic input device 101 may provide haptic and/or visual feedback based on the position of the haptic input device 101 with respect to the touch screen surface 105. Position information may be sensed by the user interface device 103 and provided to the haptic device, for example across a communications link. In other embodiments, the haptic input device may determine its location relative to the touch screen surface. As one example of position-based feedback, the haptic input device 101 may provide haptic, audible and/or visual feedback when the device passes over a selectable button or icon being displayed by the touch screen surface 105. For example, in one embodiment, the processing device of the touch-based user interface device 103 may run a graphics editing program that allows the user to create an image by moving the haptic input device 101 across the touch screen surface 105 to manipulate a cursor to draw or otherwise interact with graphical elements. In this embodiment, the haptic input element 101 may be configured to provide haptic/visual/audible feedback when the user selects the drawing cursor using the input device 101, as the user moves the input device 101 across the touch screen surface 105, or as the user interacts with, nears, passes or is over a user-selectable element. The graphics editing program may be similar to various commercial off-the-shelf programs, such as, Autodesk, Inc.'s SketchBook™ KikiPixel's Inspire Pro, Microsoft Corporation's MS Paint™, and so on.

In other embodiments, the haptic input device 101 may be configured to provide haptic, audible and/or visual feedback based the amount of pressure applied by the haptic input device 101 to the touch screen surface 105. In such embodiments, the haptic input device 101 and/or the touch screen surface 105 may include one or more pressure sensors configured to sense pressure being applied by the device 101 to the surface. In one embodiment, the haptic input device 103 may provide haptic, audible and/or visual feedback when pressure applied to the user input device by the haptic input device exceeds a predetermined threshold. In other embodiments, the haptic input device 101 may be configured to provide haptic, audible and/or visual feedback if the input device 101 and/or touch-based user input device 103 detects any pressure being applied onto the surface 105, regardless of the amount of pressure being applied. With respect to one embodiment in which the touch-based user interface device 103 is running a graphics editing program, the haptic input element 101 may allow the user to "draw" an image only if the touch-based user input device 103 and/or the haptic input device 101 determine that the user is applying sufficient pressure onto the touch screen surface 105 via the haptic input device 101. It should be appreciated that the user input device may thus determine both a location of the haptic input device on the touch screen (through capacitive sensing, for example) and a force exerted on the screen by the haptic input device (through pressure sensing, for example).

In further embodiments, the haptic input device 101 may be configured to provide haptic and/or visual feedback based on a combination of the position of the haptic input device 101 with respect to the touch screen surface 105, and the amount of pressure applied by the haptic input device 101 onto the touch screen surface. In such embodiments, the touch-based user input device 103 may allow the user to select buttons or icons only if the touch-based user input device 103 and/or the haptic input device 101 determine that the haptic input device 101 is positioned over a selectable button or icon, and that the user is applying pressure onto the touch screen surface 105 via the haptic input device 101. Similarly, with respect to embodiments in which the touch-based user interface device 103 is running a graphics editing program, the haptic input element 101 may allow the user to "draw" an image only if the touch-based user input device 103 and/or the haptic input device 101 determine that the haptic input device 101 is positioned over a "paintable" portion of the touch screen surface, and that the user is applying pressure onto the touch screen surface 105.

Certain embodiments may also provide haptic feedback that varies with a distance to a user interface element, such as a selectable icon and the like. As the haptic input device 101 approaches the user interface element, the haptic device may provide enhanced or increased feedback. For example, a frequency and/or intensity of haptic feedback may increase as the haptic input device 101 comes closer to the user interface element. Likewise, as the haptic input device (or its tip/selection portion) moves further away, the frequency and/or intensity of the feedback may diminish. In this manner, the haptic feedback may indicate if a user is approaching or receding from certain elements or portions of a display screen.

Figure 2:
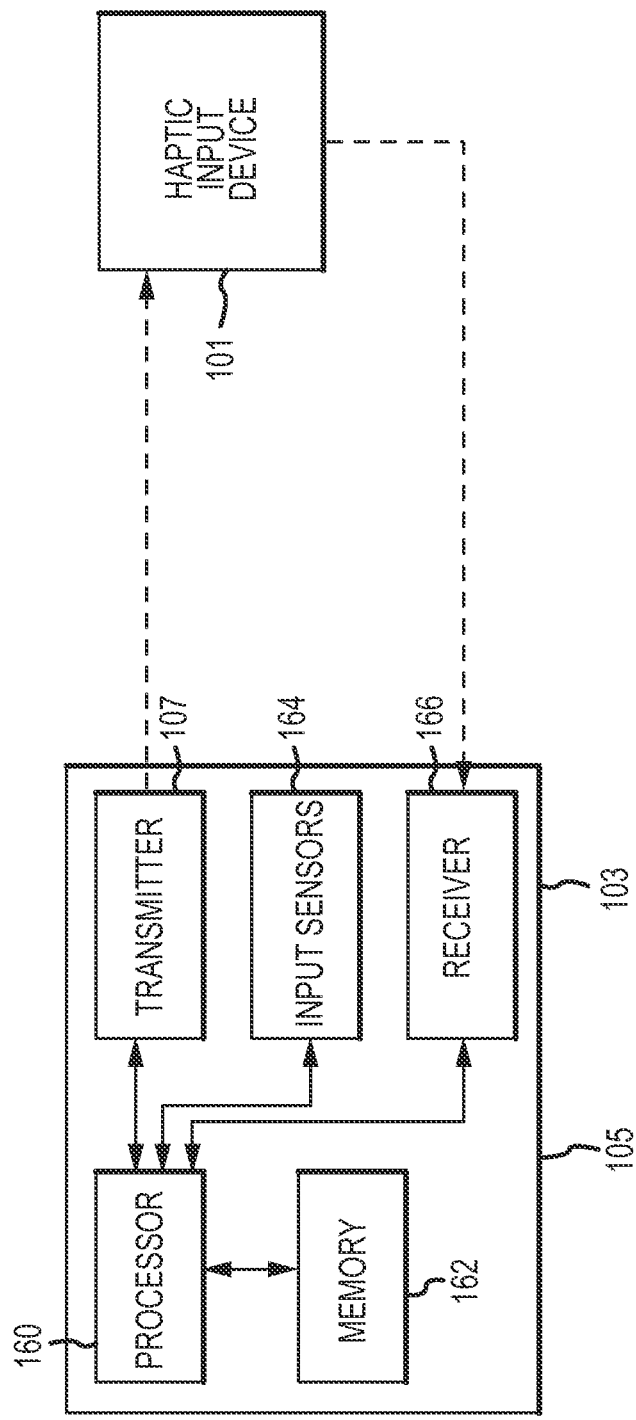
FIG. 2 is a block diagram of one embodiment of a touch-based user input device that can be used in conjunction with the system illustrated in FIG. 1.

FIG. 2 illustrates one embodiment of a touch-based user input device 103 that can be used in conjunction with the system 100 illustrated in FIG. 1. As shown in FIG. 2, the touch-based user input device 103 may include a processing device 160. The processing device 160 may be any known processing device, including, but not limited to, a central processing unit (CPU), a microprocessor, a digital signal processor (DSP), a microcontroller, a graphics processing unit (GPU), software or firmware configured to execute instructions in memory to perform various processing functions, and so on and so forth.

The processing device 160 may be communicatively coupled to a storage device 162. In one embodiment, the storage device 162 may be a memory device, such as non-volatile or volatile memory, a hard disk drive, a flash memory drive, and so on and so forth. The storage device 162 may store software or firmware for running the touch-based user interface device 103. For example, in one embodiment, the storage device 162 may store operating system software that includes a set of instructions that are executable on the processing device 160 to enable the setup, operation and control of the touch-based user interface device 103. The operating system software may also provide a menu-based operating system that can be navigated by the user through a graphical user interface displayed or presented to the user on the touch screen 105.

The processing device 160 may also be communicatively coupled to one or more input sensors 164. As alluded to above, the input sensors 164 may be configured to sense various touch-based input gestures, such as swiping, tapping, scrolling, and so on, applied across the touch screen surface 105. The input sensors 164 may be any type of sensor, including capacitive sensors, resistive sensors, acoustic sensors, infrared sensors, and so on. The touch-based input gestures may be applied by an object, such as the input device 101, a finger, and so on, and may obtain gesture information regarding the sensed gestures. For example, as discussed above, the input sensors may derive position information, such as distance and/or direction information, regarding a sensed gesture. As another example, the input sensors may be force sensors configured to measure the amount of pressure being applied to the touch screen surface 105.

The touch-based user interface 103 may further include a transmitter 107 that is communicatively coupled to the processing device 160. The transmitter 107 may be configured to transmit signals to the haptic input device 101 over a wired or a wireless connection. In one embodiment, the signals transmitted by the transmitter 107 may be radio-frequency (RF) or infrared (IR) signals. However, in other embodiments, the command signals may be other types of electromagnetic signals. For example, the command signals may be microwaves signals, radio signals, and so on and so forth. In one embodiment, the transmitted signals may be generated in response to the gesture information received from the input sensors 164. As will be further described below, the transmitted signals may be encoded with a control signal for driving a haptic actuator or a look-up value that corresponds to a control signal in a look-up table stored in a storage device of the haptic input device 101.

In some embodiments, the touch-based user interface 103 may also include an optional receiver 166 communicatively coupled to the processing device 160. The receiver 166 may be configured to receive signals from the haptic input device 101 over a wireless receiver or a wired connection. In one embodiment, the received signals may include information obtained by one or more input sensors of the haptic input device 101. As will be further discussed below, the information may include acceleration information, orientation information, pressure information, tilt information and so on.

Figure 3:
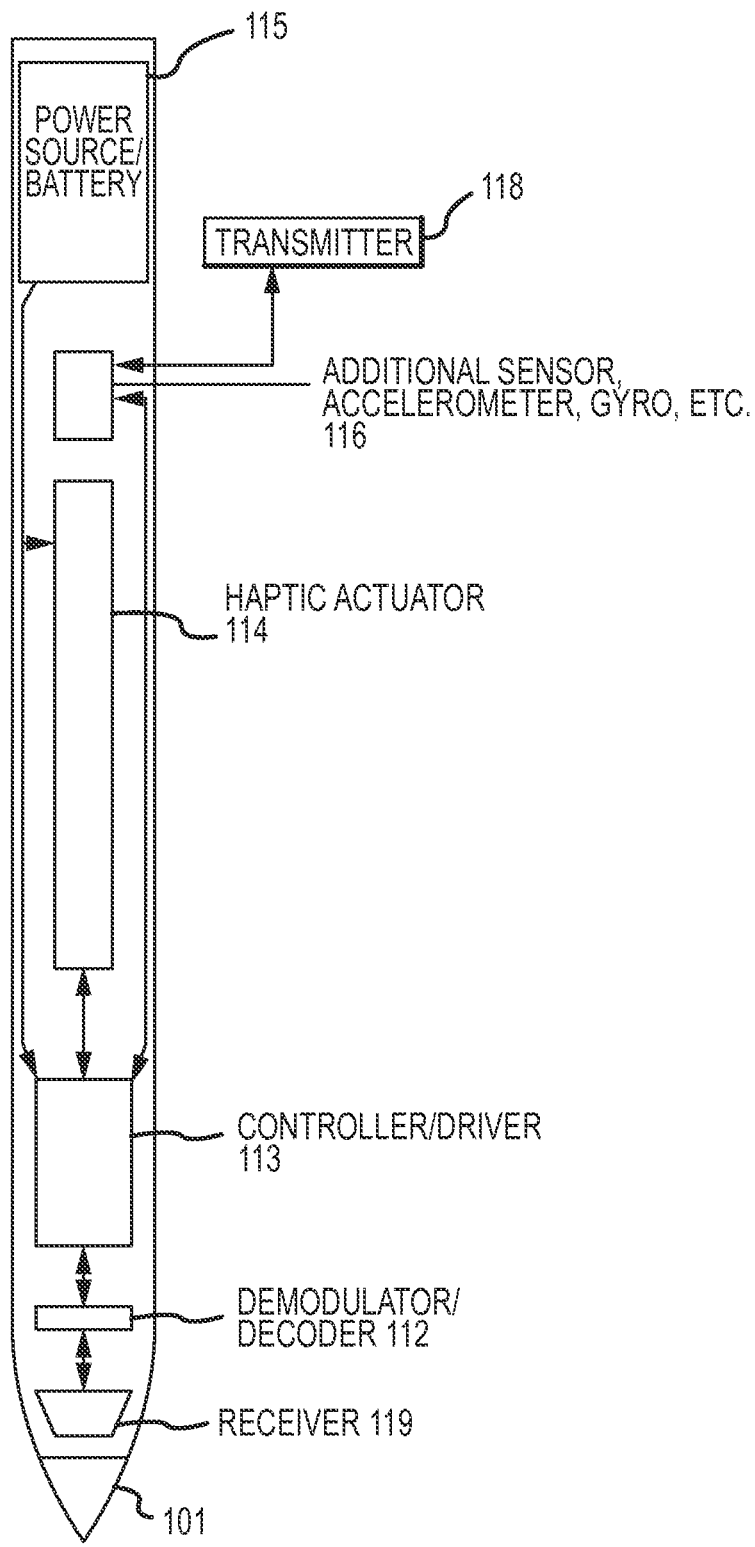
FIG. 3 is a block diagram of one embodiment of a haptic input device that can be used in conjunction with the system illustrated in FIG. 1.

FIG. 3 illustrates one embodiment of a haptic input device 101 that can be used in conjunction with the system 100 illustrated in FIG. 1. As shown in FIG. 3, in one embodiment, the haptic input device 101 may be a stylus. The haptic input device 101 may include one or more engagement portions or tips 111 configured to contact (and to register contact on) the touch screen surface 105, a receiver 119, a decoder 112, a controller 113, one or more haptic actuators 114, one or more optional sensors 116 configured to sense various characteristics of the user's manipulation of the haptic input device 101, and an optional transmitter 118. Some examples of sensors 116 that may be used in conjunction with various embodiments of the haptic input device 101 are described below. As shown in FIG. 3, the haptic input device 101 may also include a power source 115 configured to supply power to the controller 113 and/or the haptic actuator 114. The power source 115 may be a battery or some other type of power supply, such as a power adapter, an electromechanical system such as a generator or an alternator, a solar power cell, and so on and so forth.

In one embodiment, the tip 111 may be formed from a conductive material, such as metal, or from a non-metallic conductive material, such as graphite, various salts, plasmas, and so on. In other embodiments, the tip 111 may be formed from a nonconductive material. The tip 111 may include a portion configured to contact the touch screen surface 105. This portion may be pointed, as shown in FIG. 3, or may be blunt. In another embodiment, the tip may be configured as a ball that is configured to roll along the touch screen surface 105 so that different portions of the tip 111 may contact the touch screen surface 105.

The tip 111 may be communicatively coupled to a receiver 119. The receiver 119 may be any type of wireless or wired receiver that is configured to receive signals from the one or more transmitters 107 of the touch-based user interface device 103. As alluded to above, the signals may include a haptic response based on the touch-based input gestures received by the input sensors of the touch screen surface 105. In one embodiment, the receiver 119 may be configured to receive wireless signals that are wirelessly transmitted by the one or more transmitters 107. The wireless signals may be transmitted using any type of wireless transmission medium, including, but not limited to, Wi-Fi, Bluetooth, IR, RF, and so on and so forth. In other embodiments, the stylus 101 may be coupled to the touch-based user interface device 103 via a wired connection, and the receiver 119 may receive the signals from the transmitters 107 over the wired connection.

As shown in FIG. 3, the receiver 119 may be communicatively coupled to a decoder 112 that is configured to decode the signals received from the touch-based user interface device 103. In one embodiment, the touch-based user interface device 103 may modulate the signal to include a control signal for driving the haptic actuator 114 or a look-up value corresponding to a control signal for driving the haptic actuator 114, and the decoder 112 may include or take the form of a demodulator that is configured to demodulate the signal to derive the control signal and/or look-up value. If the signal is modulated with a control signal, then the decoder 112 may demodulate the signal to obtain the control signal, and transmit the control signal to a controller communicatively coupled to the decoder. In contrast, if the signal is encoded with a look-up value, the decoder 112 may process the signal to obtain the look-up value, and access a waveform memory to obtain the control signal corresponding to the look-up value. This process will be further explained below with respect to FIG. 5.

The controller 113 may receive the control signal from the decoder 112 and transmit the control signal to drive the one or more haptic actuators 114. The controller 113 may be hardware, such as a chip or an extension card configured to interface with the actuator 114, or may be software or firmware configured to manage the operation of the actuator 114.

The haptic actuator 114 may be configured to generate various types of haptic feedback based on the commands received from the controller 113. Some examples of haptic actuators 114 that may be used in conjunction with embodiments of the haptic input device 101 include electromagnetic actuators, solenoid actuators, piezoelectric actuators, electroactive polymers, vibration motors contactless actuators configured to provide electrovibratory, electrostatic and/or electrocutaneous output, and so on and so forth. For example, in one embodiment, the haptic actuator 114 may be a weight that can move axially along the shaft of the input device 101 in response to a control signal to generate a click, two clicks, vibration, and so on. In some embodiments, the haptic input device 101 may include multiple actuators 114 that are each configured to emit a different type of feedback or feedback to a different portion of the haptic input device. Other embodiments may only include a single haptic actuator 114 configured to provide a single type of feedback, or a single haptic actuator 114 configured to provide multiple types of feedback.

The haptic actuator 114 may further be configured to generate different types of haptic feedback based on touch-based input gesture information received by the touch-based user interface device 103. For example, the haptic actuator 114 may be configured to vibrate to represent an alarm, or may simulate a single or a double click to confirm the selection of a button or an icon. In another embodiment, the actuator 114 may be configured to simulate resistances or motions of the input device 101 on the touch screen surface 105. For example, the actuators 114 may be configured to simulate the feeling of moving a pen or a paintbrush across a piece of paper or a canvas. This may be accomplished by a single actuator 114 that is configured to generate different types of forces to create different types of feedback, or by multiple actuators 114 that are each communicatively coupled to the controller 113. For example, the frequency, intensity and/or duration of a haptic output waveform may be shaped to provide a particular feel to the user. A high frequency, continuous output may emulate the sensation of moving a pen across a smooth surface while a lower frequency signal may emulate the feel of moving a pen across a rougher surface. The output signal may be discontinuous to emulate the feel of a rough or bumpy surface.

In some embodiments, the haptic actuator 114 may further generate haptic feedback that can be felt by the nerves of a user's fingers without physically moving the body of the haptic input device 101. For example, the haptic actuators 114 may emit electrostatic signals that penetrate the housing of the input device 101 to stimulate the user's fingers. The electrostatic signals may stimulate various nerves in the user's fingertips, thereby allowing the user to feel a tactile sensation when holding the haptic input device 101.

In one embodiment, the controller 113 may further be communicatively coupled to one or more optional local sensors 116. The optional sensors 116 may be configured to sense various parameters based on the user's manipulation of the haptic input device 103. For example, in one embodiment, the sensors 116 may be configured to sense motion of the haptic input device 103. Continuing the example, one sensor 116 may be an accelerometer configured to detect the magnitude and/or direction of acceleration of the tip 111 of the haptic input device 103. In addition to or instead of the use of an accelerometer, the sensor 116 may be a gyroscope (or other suitable sensor) configured to measure the angle of the haptic input device 103. The sensors 116 may be communicatively coupled to the controller 113, and may transmit information to the controller 113 regarding the sensed characteristics, which may include acceleration and/or orientation information. The controller 113 may be configured to transmit corresponding control commands to the haptic actuator 114 based on the information received from the sensors 116.

The haptic device's angular measurement may be coupled with a measurement of the angle of the touch screen surface 105. The angle of the touch screen surface may be derived, for example, from a gyroscope, multi-axis accelerometer or other suitable sensor within the user interface device 103. The two angular measurements may be used together to determine a relative angle of the haptic input device with respect to the touch screen surface or user interface device. Given each angle, either the haptic device or the user interface device (or a computing device associated with either) may relatively easily and quickly determine the relative angle. "Computing devices" may include a laptop computer, desktop computer, server, tablet computer, smart phone, personal digital assistant, and so on.

The optional sensors 116 may include one or more force or pressure sensors. The force sensors may be configured to sense various forces being applied on the haptic input device 101 by the user. As alluded to above, in one embodiment, the force sensors may be configured to detect the amount of pressure being applied on the touch screen 105 by the tip 111 of the haptic input device 101. In another embodiment, the force sensors may be configured to detect the amount of pressure being applied to the haptic input device 101, for example, by a user gripping the device. The sensors 116 may transmit the pressure information to the controller 113, which may transmit corresponding control commands to the haptic actuator 114 based on the received pressure information. Accordingly, in one embodiment, the haptic feedback may be varied according to whether pressure is being applied to the haptic input device 101 and/or the amount of pressure applied to the haptic input device 101. Similarly, the entire surface of the haptic input device may sense pressure and/or capacitive changes resulting from a user gripping the instrument. In such embodiments, the pressure/capacitive sensing may be used to selectively apply haptic feedback only to those portions of the device being gripped. This may be accomplished, for example, by incorporating multiple haptic actuators into the haptic input device such that each actuator provides haptic feedback for a specific portion of the device.

In some embodiments, the haptic input device 101 may further include an optional transmitter 118 that is communicatively coupled to the one or more sensors 116. The transmitter 118 may be configured to receive information regarding the sensed parameters and transmit the information to the touch-based user input device 103 through either a wired or a wireless connection. Accordingly, the touch-based user input device 103 may adjust an output of the touch screen 105 based on the information obtained by the one or more sensors 116. In one embodiment, acceleration information from an accelerometer in the haptic input device 101 may be used to change the output of a graphics creation or editing program. For example, if the acceleration information indicates that the user is moving the haptic input device 101 at a high rate of acceleration, the line created by the graphics editing program may lighten and/or thin out from its starting point to its terminus. In contrast, if the acceleration information indicates that the user is moving the haptic input device 101 at a low rate of acceleration, the line created by the graphics editing program may become darker and/or thinner.

As another example, the output shown on the touch screen can be modified according to the orientation and/or angular information of the haptic device. This information may be captured by a gyroscope in the haptic input device 101, or other suitable sensor. Likewise, the output may depend not only on the absolute angle of the haptic device, but the relative angle of the haptic device to the touch screen and/or user input device 103. As mentioned above, this relative angle may be determined from the absolute angle of the haptic device and the absolute angle of the user input device. As one example of how an output may be adjusted, the width of the line created by the graphics editing program may adjusted according to the tilt of the haptic input device 101 relative to the touch screen 105 to simulate writing with a calligraphy pen or painting with a paint brush. Additionally, the angle and/or thickness of the line may be adjusted according to the tilt of the haptic input device 101 relative to the touch screen 105, with a higher tilt corresponding to the creation of a more slanted, thicker or angled line, for example. (Alternative embodiments may vary the effect of the haptic input device's tilt angle on an output generated by the user input device.) Thus, a single haptic device may be used to create a line of varying thickness or depth of color in a single stroke, or another output that varies physically or temporally in response to changes in pressure, capacitance, angle and the like during a continuous input.

The haptic device 101 may have one or more orientation sensors, such as a multi-axis accelerometer, that may determine the axial orientation of the haptic device. Thus, the orientation sensor may detect when the haptic device 101 rotates. This rotational information may also be used to vary an input from the haptic device or an output shown on a display in response to the haptic device's input. Rotating the haptic device may, for example, be substituted for certain conventional input gestures such as clicking or tapping. Likewise, an output may be varied as the haptic device is rotated. A line may be made thicker or thinner in a graphics program, for example. As another example, rotating the haptic device in one direction may increase an audio volume from an associated device, while rotating the haptic device in another direction may decrease the audio volume.

As another example, the line created by the graphics editing program can be modified according to the pressure information captured by a force sensor in the haptic input device 101. For example, the width and/or darkness of the line created by the graphics editing program may be adjusted according to the amount of pressure being applied onto the haptic input device either by a user's grip or by forcing a tip of the input device onto the touch screen or other surface. In one embodiment, more pressure may correspond to a darker and/or a thicker line, while less pressure may correspond to a lighter and/or thinner line. Likewise, changes in grip pressure may be used to signal different inputs to the touch screen 105/user input device 103.

It should be appreciated that the haptic feedback provided by the haptic input device 101 may vary with the output of the display device, as described above. Returning to the example of adjusting a line thickness, as the line appears thicker on the screen, a haptic output from the haptic device 101 may likewise increase in frequency, intensity, duration and the like. This haptic feedback may be more readily perceived by the user than the change in line thickness, for example if the haptic input device is moving relatively slowly across the touch screen or other display device and so obscuring recent portions of the graphical line. Thus, the user may perceive the haptic feedback and use it to adjust the input or output generating the feedback (in this case, the line thickness). Accordingly, the haptic feedback may be part of a closed loop with the user input and may provide data to the user that is useful in modifying his input, such as grip strength, pressure on a touch screen and the like.

In another embodiment, the haptic input device 101 may further include an optional audio transmitter, such as a speaker, that is communicatively coupled to the controller 113. The controller 113 may transmit control commands to the speaker based on information received from the sensors 116 and/or the one or more transmitters 107 on the touch-based user input device 103. The output of the speaker may vary based on the activity being simulated, as well as the user's manipulation of the haptic input device 101. For example, in one embodiment, the speaker may simulate the sound of moving a pen or a paintbrush across a piece of paper or a canvas, with the speaker emitting different sounds for emulating a pen or a paintbrush. In another embodiment, the volume of the speaker may be adjusted based on the amount of pressure being applied to the touch screen surface 105. For example, the volume may be gradually increased as the input device 101 applies more pressure to the touch screen surface 105. In other embodiments, the volume and/or sound may be adjusted according to the position of the input device 101 relative to the touch screen surface 105.

It should be appreciated that some embodiments may employ only a haptic input device 101 and no user input device and/or touch screen. For example, the haptic input device 101 may be used with a sheet of paper, flat surface and the like to provide input to an appropriately-configured computing device. In such embodiments, a visual output on a display associated with the computing device, or an audible output from a speaker associated with the computing device, may be varied in the foregoing manners and/or according to the foregoing description.

Figure 4:
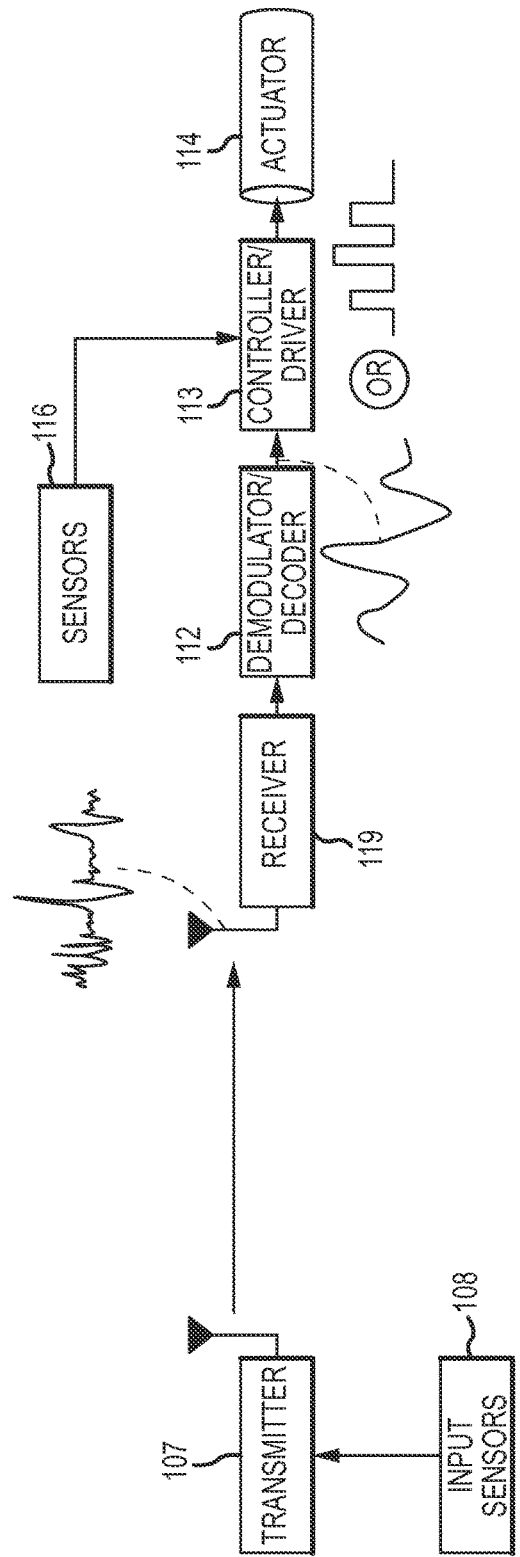
FIG. 4 is a block diagram of the transmitter and one or more input sensors of the touch-based user interface device shown in FIG. 1, as well as the receiver, decoder, controller, optional sensors, and haptic actuator of the haptic input device shown in FIG. 3.

FIG. 4 is a block diagram showing the transmitter 107 and one or more input sensors 108 of the touch-based user interface device 103 of FIG. 2, as well as the receiver 119, decoder 112, controller 113, optional sensors 116, and haptic actuator 114 of the haptic input device 101 shown in FIG. 3.

As shown in FIG. 4, in one embodiment, the transmitter 107 of the touch-based user interface device 103 may be configured to transmit a signal to the receiver 119 of the haptic input device 101. As discussed above, the signal may carry a control signal for driving the haptic actuator 114 or a look-up value corresponding to a control signal. The transmitted signal may be based on information obtained from various input sensors 108 integrated into the touch screen surface 105 of the touch-based user interface device 103, such as the position of the haptic input device 101 on the touch screen surface 105, the amount of pressure being applied by the input device 101 onto the touch screen surface 105, and so on.

The receiver 119 of the haptic input device 101 may transmit the signal received from the transmitter 107 to the decoder 112, which may be configured to decode the signal to obtain either the control signal or the look-up value, and to transmit the control signal or the look-up value to the controller 113. If the decoder 112 transmits a control signal to the controller 113, the controller 113 may transmit the control signal through a driver to the haptic actuator 114, which may generate haptic feedback consistent with the control signal. In contrast, if the decoder 112 transmits a look-up value to the controller 113, the controller 113 may process the look-up value to obtain a control signal corresponding to the look-up value, and transmit the control signal to the haptic actuator 114.

Alternatively, the controller 113 may receive a signal from one or more optional sensors 116. As discussed above, the one or more optional sensors 116 may be provided in the haptic input device 101, and may sense various parameters of the haptic input device 101. The parameters may include the orientation of the input device 101, the pressure being applied to the input device 101 by the user's fingers, the pressure being applied by the tip of the input device 101 onto the touch screen surface 105, the acceleration of the input device 101 across the touch screen surface 105, and so on and so forth. Upon receiving the signal from the sensors 116, the controller 113 may generate a control signal from the signal and transmit the waveform to the haptic actuator 114, which may generate haptic feedback consistent with the waveform.

Figure 5:
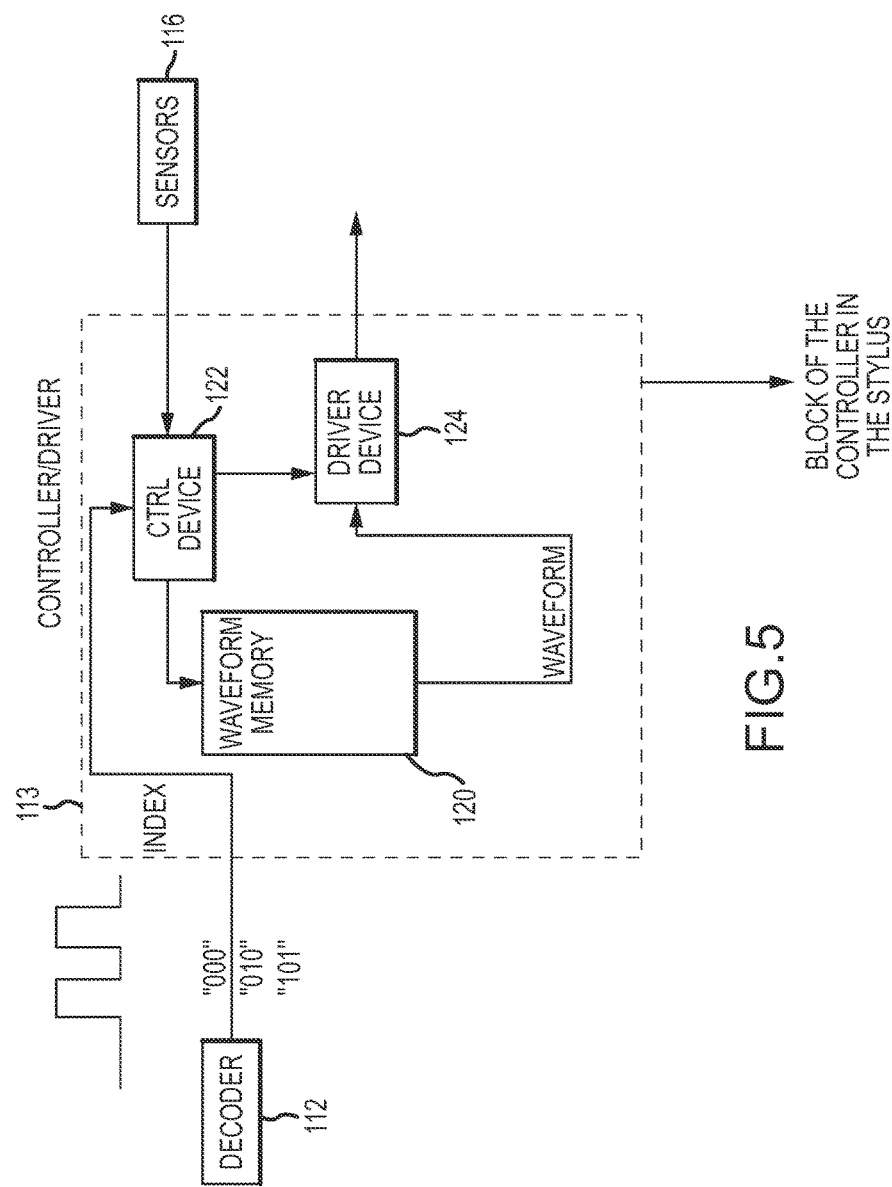
FIG. 5 is a block diagram of one embodiment of a controller that may be used in conjunction with the haptic input device shown in FIG. 1.

FIG. 5 illustrates one embodiment of a controller 113 that may be used in conjunction with the haptic input device 101 shown in FIG. 1. The controller 113 may include a waveform memory 120, a local control device 122, and a local driver device 124 communicatively coupled to the local control device 122 and the waveform member 120. The waveform memory 120 may be configured to store one or more preprogrammed waveforms, which may produce different haptic feedback responses when processed by a haptic actuator 114.

As alluded to above, the decoder 112 may transmit a look-up value to the controller 112. The look-up value may correspond to one or more control signals stored in the waveform memory 120. In one embodiment, the look-up value may be a series of binary 1's and 0's that can be transmitted over a low data rate transmission link. The look-up value may correspond to an entry in a look-up table storing a corresponding control signal for driving the haptic actuator or a set of corresponding control signals for driving the haptic actuator. Upon receiving the look-up value, the local control device 122 may access the waveform memory 120 to determine whether any of the control signals stored in the waveform memory 120 correspond to the received look-up value. If the local control device 122 determines that the received look-up value corresponds to at least one of the waveforms stored in the waveform memory 120, the control device 122 may access the waveform memory 120 and transmit the corresponding control signal or control signals to the driver device 124. The local control device 122 may further transmit a control command to the driver device 124 to transmit the control signal or control signals from the waveform memory 120 to the haptic actuator 114. In another embodiment, the optional sensors 116 of the haptic input device 101 may transmit the look-up value to the local control device 122.

Figure 6:
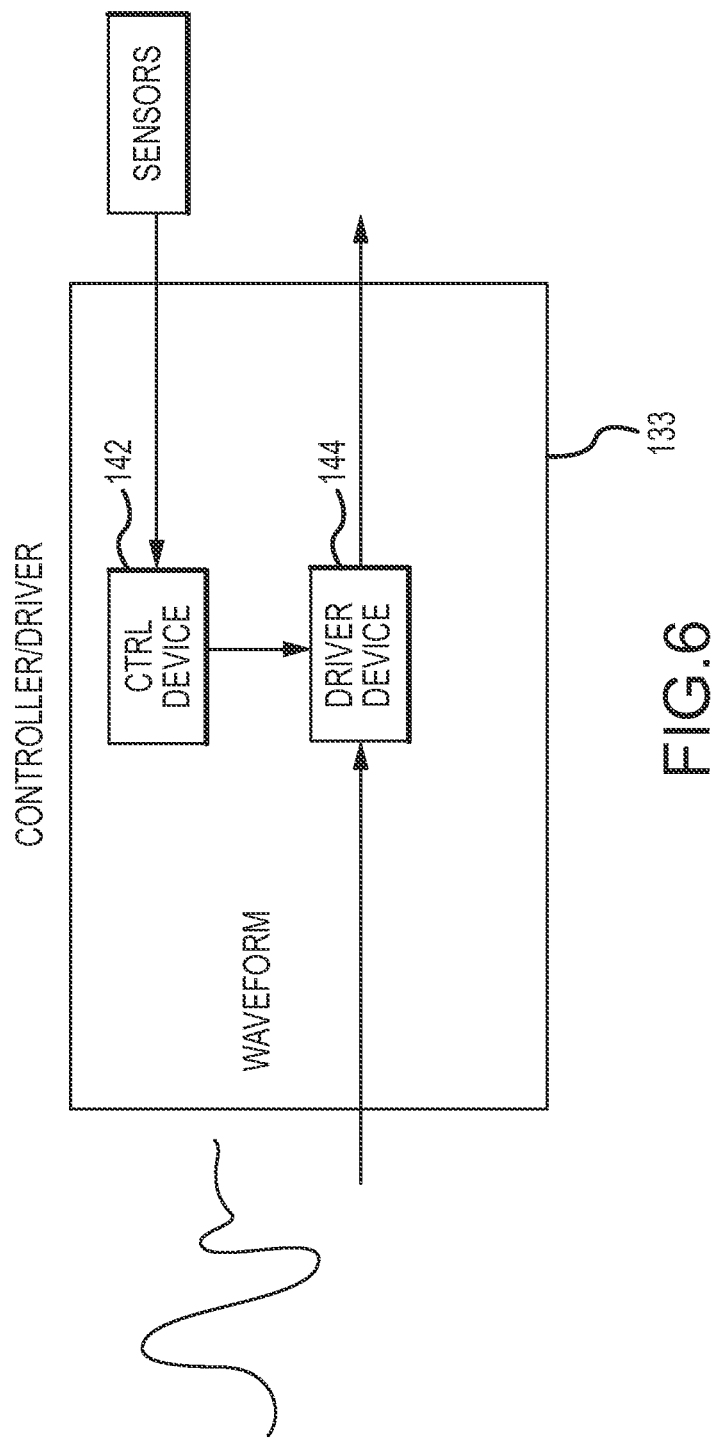
FIG. 6 is a block diagram of another embodiment of a controller that may be used in conjunction with the haptic input device shown in FIG. 1.

FIG. 6 illustrates another embodiment of a controller 133 that may be used in conjunction with the haptic input device 101 shown in FIGS. 3 and 4. The controller 133 may include a local control device 142 and a local driver device 144 communicatively coupled to one another. In this embodiment, the touch-based user interface device 103 may transmit a carrier signal modulated with a command signal for driving the haptic actuator 114 (shown in FIG. 3). Further, the decoder 113 may demodulate the control signal from the carrier signal. The control signal may then be transmitted to the local driver 144, which in turn, may transmit the control signal to the haptic actuator 114 upon receiving a corresponding control command from the local control device 142.

Some embodiments may include a controller that is configured to receive both control signals and look-up values. In such embodiments, the controller may further be configured to update the control signals stored in the look-up table and/or the stored look-up values based on signals received from the touch-based user interface device 103. For example, to change or update the haptic feedback associated with a particular look-up value, the controller may receive a look-up value and an updated control signal associated with the look-up value from the touch-based user interface device 103 and replace the control signal stored in the database with the updated control signal.

Figure 7:
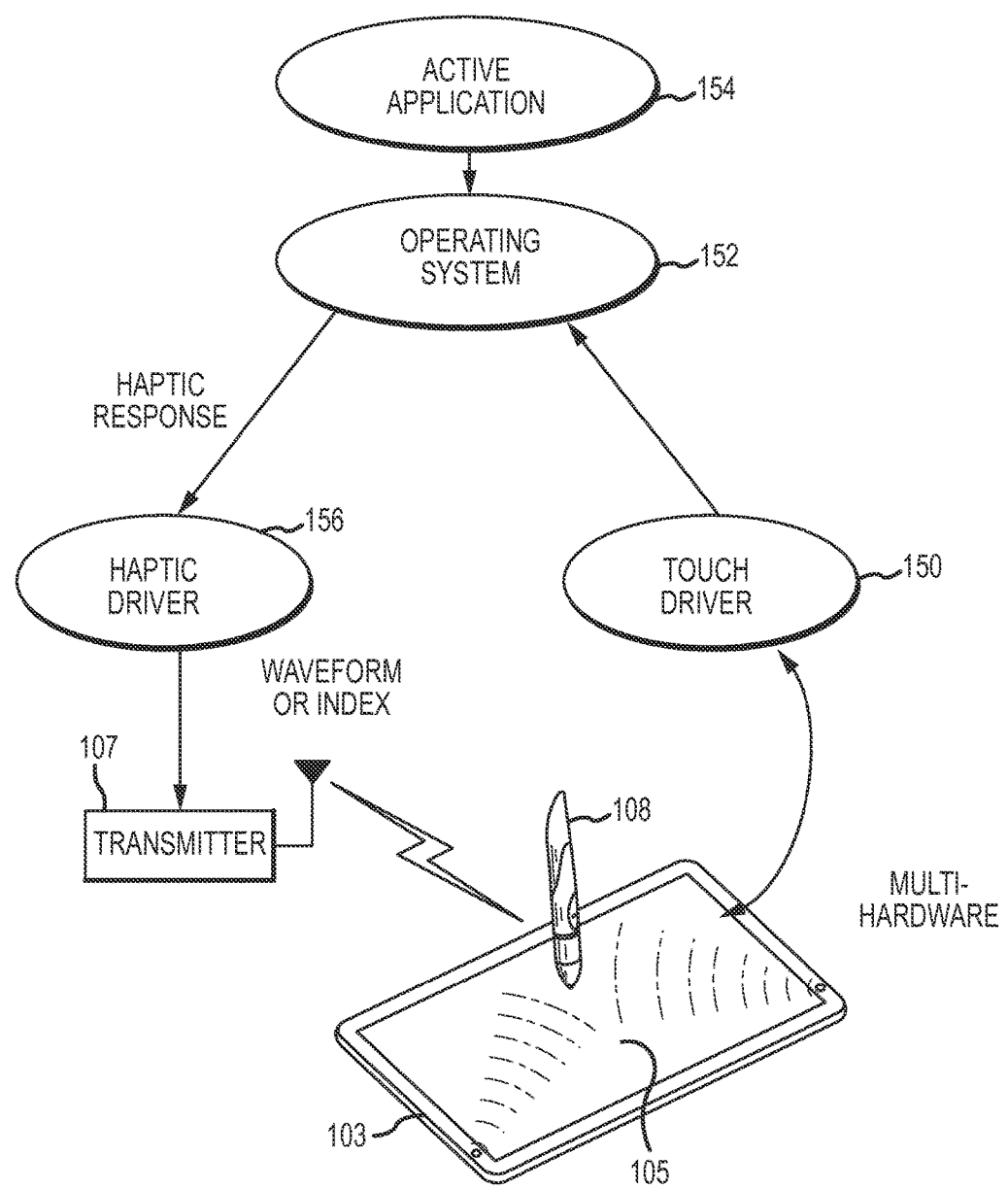
FIG. 7 illustrates a schematic diagram of the operation of the system illustrated in FIG. 1, according to one embodiment.

FIG. 7 is a schematic diagram one possible operation of the system 100 illustrated in FIG. 1. As shown in FIG. 7, the touch-based user interface device 103 may run an operating system 152 supporting one or more software or firmware applications. In one embodiment, the operating system may include a graphical user interface allowing a user to select and run such applications or otherwise interact with the device 103. For example, an active application may be a game, a graphics editing program, a word processing program, and so on. As alluded to above with respect to FIG. 2, the operating system 152 may be stored in the storage device 162 of the touch-based user interface device 103, and accessed and implemented by the processor 160.

The touch-based user interface device 103 may include a touch driver 150 to determine a position and/or pressure exerted by the haptic input device 101 on the touch screen 105. As alluded to above, the position and/or pressure information may be obtained through one or more input sensors 164 of the touch-based user interface device 103. The touch driver 150 may be software stored on the storage device 162 of the touch-based user interface device 103 or may be implemented as a hardware component of the touch-based user interface device 103.

The operating system 152 may then transmit the position and/or pressure information to a haptic driver 156, which may process the position and/or pressure information to determine an appropriate haptic response. For example, in one embodiment, the haptic driver 156 may access a local storage device storing a relational database containing one or more position and/or pressure parameters and one or more corresponding control signals or look-up values. The haptic driver 156 may be software stored in the storage device 162 of the touch-based user interface device 103 or may be a separate hardware component. Upon matching the position and/or pressure information with the appropriate control signal or look-up value, the haptic driver 156 may transmit the control signal or look-up value to the haptic input device 101 via a transmitter 107 of the touch-based user interface device 103.

Figure 8:
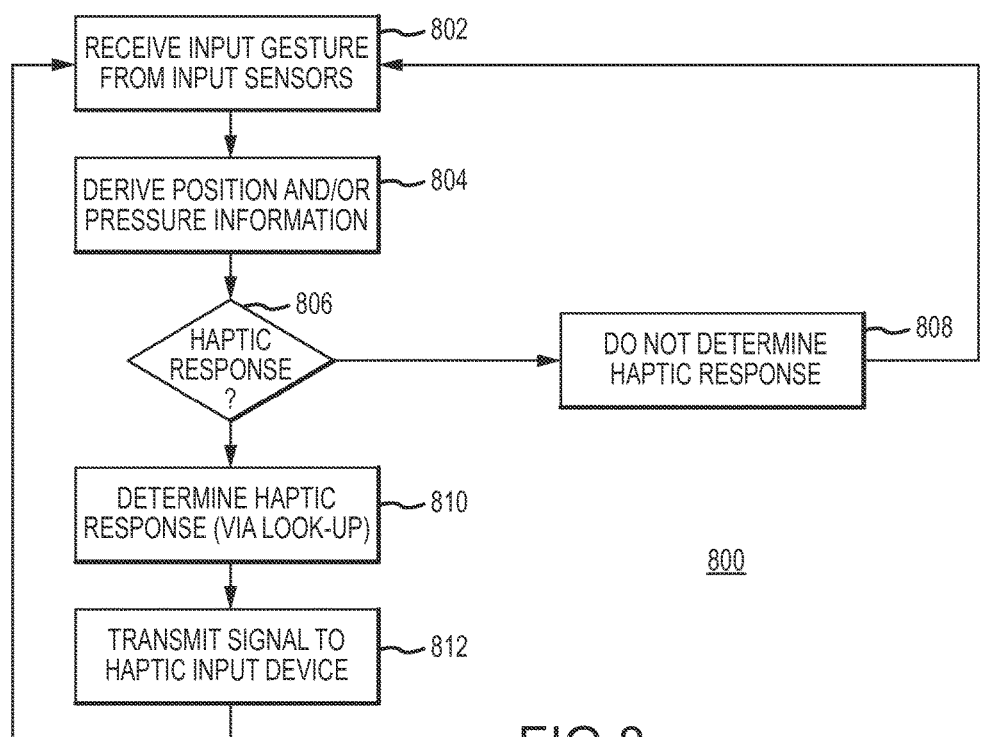
FIG. 8 is a flowchart illustrating one embodiment of a method for providing haptic feedback.

FIG. 8 is a flowchart illustrating one embodiment of a method 800 for providing haptic feedback. For example, the illustrated method 800 may be performed by the processing device 160 of the touch-based user interface device 103 shown in FIGS. 1 and 2. The method 800 may begin by receiving input gestures from one or more input sensors. As discussed above, the input gestures may include swiping, tapping, scrolling, and so on, applied across the touch screen surface 105. The input sensors may include position and/or pressure sensors. The input gestures may be applied by a haptic input device 101. In the operation of block 804, position and/or pressure information may be derived from the input gestures received from the one or more input sensors. The position information may be in x-y coordinate form, while the pressure information may be measured as the force per unit area in a direction perpendicular to the touch screen surface 105.

In the operation of block 806, the processing device may determine whether or not to generate a haptic response based on the position and/or pressure information. In one embodiment, this may involve determining whether the haptic input device 101 is positioned over a selectable item, which can be a button, an icon, a cursor, and so on, displayed on the touch screen surface 105. In another embodiment, the processing device may determine whether the haptic input device 101 is applying a sufficient amount of pressure to the touch screen surface 105. In a further embodiment, the processing device may determine both whether the haptic input device 101 is positioned over a selectable button or icon, as well as whether the device 101 is applying a sufficient amount of pressure to the touch screen surface 105. If, in the operation of block 806, the processing device determines that a haptic response is appropriate, then, in the operation of block 810, the processing device may determine the appropriate haptic response associated with the input gestures. This may be accomplished by referencing a relational database, such as a look-up table, storing one or more input gestures and one or more haptic responses associated with the one or more input gestures. The haptic responses may be in the form of control signals for driving the haptic actuator in the haptic input device 101 or look-up values corresponding to one or more control signals for driving the haptic actuator. In the operation of block 812, the processing device may transmit the one or more control signals (or look-up values) to the haptic input device 101. The method 800 may then proceed back to the operation of block 802, in which the processing device may receive another input gesture.

If, in the operation of block 806, the processing device determines that a haptic response is not appropriate, then, in the operation of block 808, the processing device may not determine a haptic response associated with the received input gesture. In such situations, no haptic response may be emitted from the haptic input device. For example, in one embodiment, the processing device may determine that a haptic response it not appropriate if the pressure applied by the haptic input device 101 onto the touch screen surface 105 is insufficient. In another embodiment, the processing device may determine that a haptic response is not appropriate if the haptic input device 101 is not located in a position that enables selection of an item being displayed on the touch screen. The method 800 may then proceed back to the operation of block 802, in which the processing device may receive another input gesture.

Figure 9:
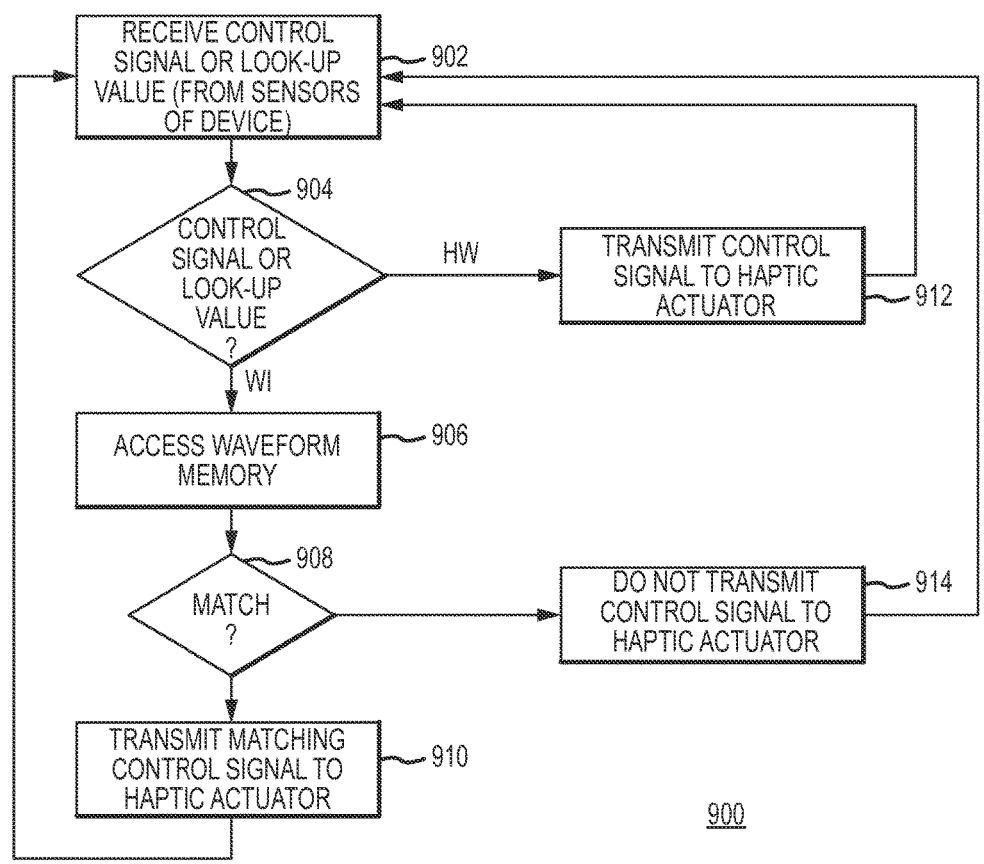
FIG. 9 is a flowchart illustrating another embodiment of a method for providing haptic feedback.

FIG. 9 is a flowchart illustrating another embodiment of a method 900 for providing haptic feedback. For example, the illustrated method 900 may be performed by the controller 113 of the haptic input device 101 shown in FIGS. 1 and 3. The method 900 may begin by receiving a control signal or a look-up value, as indicated in block 902. The control signal or the look-up value may be received from the transmitter 107 of the touch-based user interface device or from one or more input sensors 116 of the haptic input device 101. As discussed above, a control signal may be used to drive the haptic actuator in the haptic input device 101, while a look-up value may correspond to one or more control signals stored in a database. In the operation of block 904, the controller 113 may determine whether a control signal or a look-up value is received. The operation of block 904 is optional. If, in the operation of block 904, the controller 113 determines that a look-up value is received, then, in the operation of block 906, the haptic input device 101 may access the waveform memory, which may include a relational database storing one or more look-up values and one or more corresponding control signals associated with the look-up values. In the operation of block 908, the controller 113 may determine whether there is a match between at least one of the one or more look-up values and at least one of the control signals. If, in the operation of block 908, the controller 113 determines that there is a match, then, in the operation of block 910, the controller 113 may transmit the control signal matching the look-up value to the haptic actuator. If, in the operation of block 908, the controller 113 determines that there is no match, then, in the operation of block 914, the controller 113 may not transmit a control signal to the haptic actuator. The method may then return to the operation of block 902, in which the controller 113 may receive a control signal or a look-up value.

If, in the operation of block 904, the controller 113 determines that a control signal is received, then, in the operation of block 912, the controller 113 may transmit the control signal to the haptic actuator. The method may then return to the operation of block 902, in which the controller 113 may receive a control signal or a look-up value.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element are all possible sequences of execution.

Although the haptic device 101 is generally described above as operating in conjunction with a touch screen, it should be appreciated that certain embodiments of the haptic device may be configured to operate with any surface or even while held in the air (e.g., without the tip touching anything). For example, location sensors (accelerometers, gyroscopes, and the like) may be used to determine a position and motion of the haptic device. A pressure sensor in the tip may initiate input to an associated computing device when the haptic device is pressed against a surface. Alternatively, one or more pressure sensors may be located along the barrel of the haptic device and measure pressure exerted thereon by a user's grip. Input may be provided from the haptic device to the computing device when the pressure on the barrel exceeds a certain threshold. Still other embodiments may omit pressure sensors entirely and function to provide input only when the haptic device is in an on state. Essentially, the haptic device may be configured to provide any functionality described herein without requiring a touch screen to accept that input.

In addition, it should be appreciated that the haptic input device 101 may generate haptic feedback based on the touch screen sensing a touch by an object other than the haptic input device. For example, if a finger touches the touch screen, the haptic device may output haptic feedback to indicate the touch. Further, the gesture or other input provided by the object may vary the nature of the haptic feedback. Continuing the example, a finger moving up and down on a touch screen to scroll a webpage or other document may provide a sustained "swoosh" of haptic feedback from the haptic input device. The same finger tapping the touch screen may cause the haptic input device to output a single thump.

Certain embodiments may support the operation and detection of multiple haptic input devices with a single user input device. For example, a single touch screen may detect impacts from multiple haptic input devices. Further, in such embodiments an input from a haptic input device may produce a haptic output in a different haptic input device. That is, a first haptic device interacting with the touch screen (or the like) may cause a second haptic input device to output haptic feedback. This may be useful in various multi-person endeavors, such as collaborative editing, game playing and the like.

Still another embodiment may permit communication between multiple haptic input devices and/or multiple user input devices. For example, four people may each have their own haptic input device and touch screen/user input device. Each user action with his or her user input device may cause one or more of the other persons' haptic input devices to produce a haptic output. Such embodiments may also be useful in multi-person activities such as gaming.

The foregoing discussion provides example embodiments, methods and operations of a haptic device. Accordingly, they should be understood as examples only and not as limitations. The proper scope of protection is defined by the following claims.

The invention claimed is:

1. A haptic input device held by a user, comprising:
   a housing defining a tapered input end to interact with a screen of a touch-based user interface device, the housing enclosing:
   a receiver within the tapered input end and configured to wirelessly receive a signal from the touch-based user interface device, the received signal corresponding to a touch input gesture provided to the screen by the user and detected by the touch-based user interface device;
   a decoder to extract an input signal from the received signal;
   a controller to generate a control signal based on the input signal;
   a haptic actuator to provide a first haptic feedback response corresponding to the control signal;
   a sensor to determine an orientation of the haptic input device relative to the touch-based user interface device; and
   a transmitter to transmit the orientation to the touch-based user interface device; wherein
   the haptic actuator is configured to provide a second haptic feedback based on the orientation.

2. The haptic input device of claim 1, wherein the sensor comprises an accelerometer.

3. The haptic input device of claim 1, wherein the sensor comprises a pressure sensor.

4. The haptic input device of claim 1, wherein the sensor comprises a gyroscope.

5. The haptic input device of claim 1, wherein the received signal comprises an analog signal to drive the haptic actuator.

6. The haptic input device of claim 1, wherein the received signal comprises a look-up value corresponding to a control signal configured to drive the haptic actuator.

7. The haptic input device of claim 6, wherein the look-up value comprises at least one binary value.

8. The haptic input device of claim 6, wherein the controller comprises a waveform memory storing one or more look-up values and one or more control signals, each corresponding to one of the one or more look-up values.

9. The haptic input device of claim 1, further comprising an engagement portion configured to engage an exterior surface of the screen.

10. A method for providing haptic feedback, comprising:
  detecting an input gesture by at least one input sensor of a touch-sensitive input device, the input gesture performed by a stylus in contact with a touch screen surface of the touch-sensitive input device;
  deriving, by a processor within the touch-sensitive input device, an orientation characteristic of the stylus;
  receiving, by the processor, a signal from the stylus comprising a acceleration characteristic of the stylus;
  determining, by the processor, a haptic response based on the orientation characteristic, the acceleration characteristic, and the input gesture; and
  transmitting a haptic output signal to the stylus, the haptic output signal comprising a look-up value corresponding to the haptic response, the output signal instructing the stylus to provide the haptic response.

11. The method of claim 10, wherein the look-up value comprises a series of binary values.

12. The method of claim 10, further comprising:
  receiving an external signal from an external user input device; and
  determining the haptic response based at least partially on the external signal.

13. The method of claim 12, wherein the haptic response provides an output to a user signifying an interaction between a second haptic input device and the external user device.

14. The method of claim 10, wherein:
  the input gesture is a first input gesture; and
  the method further comprises:
    detecting a second input gesture provided by an object in contact with the touch screen surface; and
    determining the haptic response based at least partially on the second input gesture.

15. The method of claim 10, further comprising:
  determining a pressure exerted on the stylus by a user; and
  using the pressure to modify the haptic response.

16. A haptic input device, comprising:
  a housing comprising an input end and a sensor end, the input end configured to contact a touch-sensitive surface of a user interface device;
  a receiver within the input end and configured to receive a modulated signal from the user interface device, the modulated signal corresponding to a gesture input provided by the input end to the touch-sensitive surface;
  a demodulator in communication with the receiver and configured to extract an input signal from the modulated signal;
  a sensor within the sensor end and configured to provide sensor data based on an orientation characteristic of the haptic input device relative to the user interface surface; and
  a controller in communication with the demodulator and the sensor and configured to generate a control signal based in part on the input signal and in part on the sensor data;
  a haptic actuator coupled to the controller and configured to provide a haptic feedback response based on the control signal; and
  a transmitter configured to transmit the sensor data to the user interface device such that an output of the user interface device is modified based on the sensor data;
  wherein the sensor end is opposite the input end.

* * * * *